UNITED STATES PATENT OFFICE.

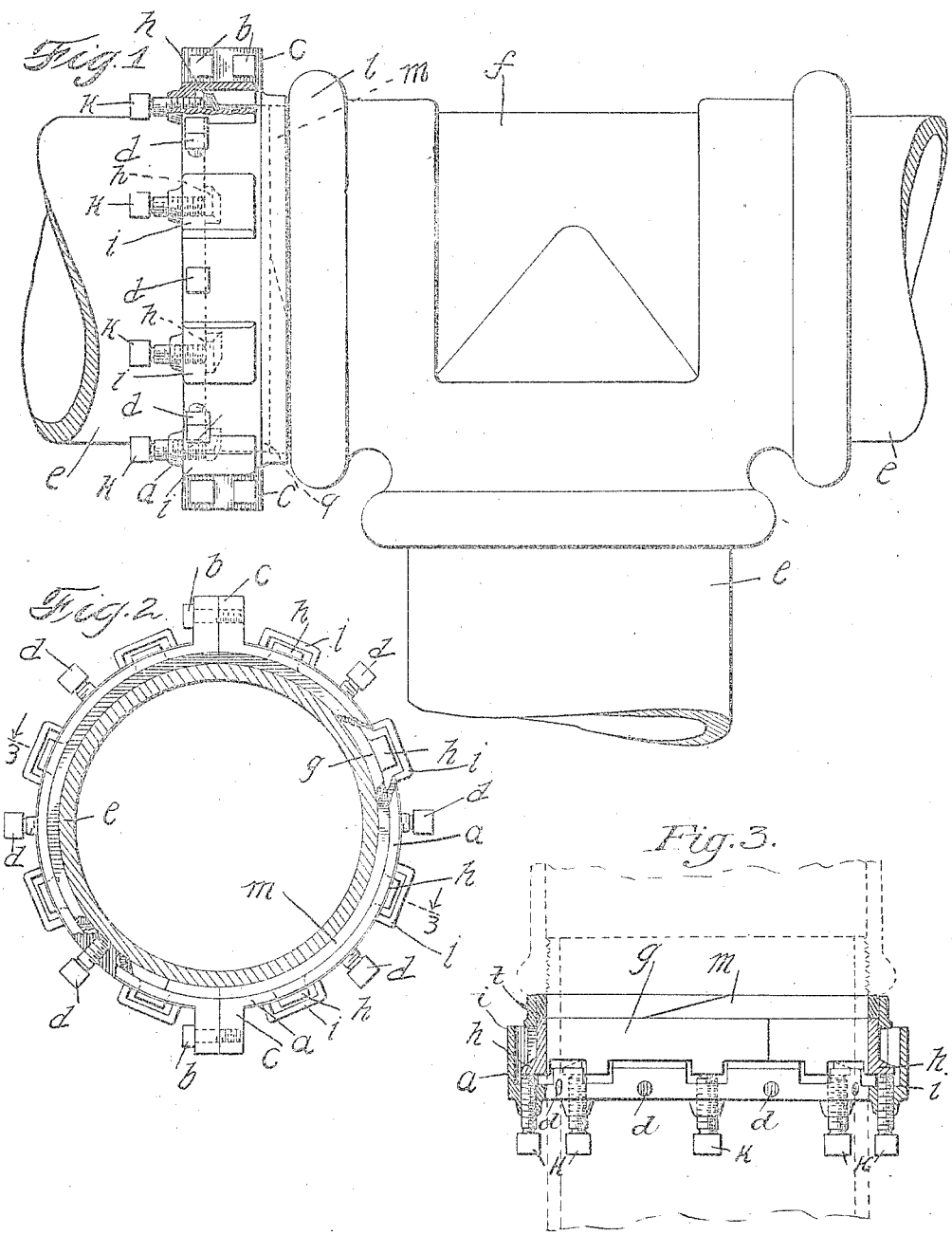

HENRY P. G. REED, OF CHICAGO, ILLINOIS, ASSIGNOR TO GEORGE W. PHILLIPS, OF CAMDEN, NEW JERSEY.

CLAMP FOR PIPES.

SPECIFICATION forming part of Letters Patent No. 706,780, dated August 12, 1902.

Application filed June 28, 1899. Serial No. 722,125. (No model.)

*To all whom it may concern:*

Be it known that I, HENRY P. G. REED, a citizen of the United States, residing at Chicago, in the county of Cook and State of Illinois, have invented a certain new and useful Improvement in Clamps for Pipes, (Case No. 1,) of which the following is a full, clear, concise, and exact description, reference being had to the accompanying drawings, forming a part of this specification.

My invention relates to clamps for stopping leaks at pipe-joints.

As is well known, leaks frequently occur where pipe-sections have threaded or other engagement with other piping portions, as elbows, flanges, valves, cocks, bushings, and other devices having connection with pipes. The pipe-section and the portion surrounding and engaging the same frequently separate sufficiently to permit the egress of the gas, fluid, or liquid that is being conveyed. These difficulties are more frequently experienced in piping systems for distributing steam, and my invention is primarily designed for overcoming the leakage of steam in piping systems, although it is not to be limited to this precise use.

Generally speaking, my invention may be described as consisting, in its preferred embodiment, of an annulus for surrounding pipe, formed in sections, and which is clamped thereon, inclosing a second annulus, also inclosing the pipe and formed in sections and provided with a packing-face adapted to engage a pipe-joint and a portion of the pipe contiguous to said joint to seal leaks between the same. The second annulus is adapted to be moved longitudinally of the pipe and of the fixed annulus, a plurality of adjusting-screws being provided upon the fixed annulus and adapted to act longitudinally against the movable annulus to force the packing strip or face provided thereon against the joint. By providing a plurality of these clamping or adjusting screws I am enabled to effect adjustment of the packing, which adjustment may vary to suit the irregularity in the pipe-joint. The fixed annulus and the movable annulus are formed in practice in half-rings to enable them readily to be assembled about piping.

I will explain my invention more particularly by reference to the accompanying drawings, which illustrate the preferred embodiment thereof.

In the drawings, Figure 1 is a side elevation of a clamp embodying the invention in place about a pipe, parts being broken away more clearly to reveal the construction. Fig. 2 is an end elevation of a clamp in place about a pipe, parts being broken away. Fig. 3 is a sectional view on line 3 3 of Fig. 2, the pipe being removed for the sake of clearness.

Like letters indicate like parts throughout the different figures.

The annulus $a$ is formed of two half-rings, as shown, these half-rings being preferably united by bolts $b\ b$, engaging radial lugs $c\ c$, provided upon the half-rings. A number of radially-acting screws $d\ d$ are provided about the cylindrical face of the said annulus, by means of which the annulus when assembled about the pipe may be rigidly fixed with relation thereto. In the drawings I have illustrated sections of pipe $e\ e$, having threaded engagement with a T-joint $f$, the clamp of my invention being shown about one of said pipe-sections. The annulus $a$ has a portion of its bore enlarged to receive a second annulus $g$ between the same and the pipe and at the same time to permit free longitudinal movement of the annulus $g$. This annulus is also formed in two half-rings. A number of radial and outwardly-extending lugs $h$ are provided upon the latter annulus and are inclosed by jackets $i$, cast upon the annulus $a$, affording recesses in said annulus to receive said lugs, so that these members of the clamp will not readily be disunited after having been assembled. The jackets $i$ are cast integrally with the ring $a$ and project slightly beyond the same to receive the lugs $h$, as indicated most clearly in Fig. 3, the jackets thus virtually forming outwardly-projecting parts of the ring. A number of longitudinally-acting screws $k\ k$ are passed through the fixed annulus and engage the lugs $h$, whereby the annulus $g$ is forced longitudinally toward an opposed annular rim $l$ of a joint.

A packing-strip $m$, formed of suitable material, is provided upon the face of the annulus $g$ that is to oppose the pipe-joint, thus constituting a packing-face. The packing-strip is preferably scarfed at its ends to prevent leakage between the engaging ends of the same. This packing-strip is held in position about the pipe by the inclosing projecting annular band $l$ of the annulus $a$.

It will be apparent by reference to the drawings that that portion of the external sectional annulus which is immediately opposed to the rim $l$ of the joint and which confines the packing-ring $m$ is formed integral with the main body of the ring, from which main body the lugs $c\ c$ project. By means of the screws $k$ the longitudinal adjustment of the different parts of the packing-face may be varied to compensate for any irregularities in the face of the pipe-joint with which the packing-strip is to have fixed engagement. Where a rubber compound is employed, the ends of the packing when scarfed will merge under the action of the heat.

While I have shown and particularly described one precise pipe-clamp constructed in accordance with my invention, it is obvious that changes may readily be made without materially departing from the invention, and I do not, therefore, wish to be limited to the precise construction shown; but, Having described my invention, I claim as new and desire to secure by Letters Patent—

1. In a pipe-clamp, the combination with an annulus adapted to be fixedly supported upon a pipe, of an annular packing-strip surrounded by said annulus and movable longitudinally of the annulus and adapted for fixed engagement with an opposed face of a pipe-joint, and a plurality of independently-acting adjusting devices $k$ acting longitudinally of the pipe for effecting a fixed engagement between the packing-strip and an opposed face of a pipe-joint, substantially as described.

2. In a pipe-clamp, the combination with an annulus adapted to be fixedly supported upon a pipe, of an annular packing-strip surrounded by said annulus and movable longitudinally of the annulus and adapted for fixed engagement with an opposed face of a pipe-joint, and a plurality of independently-acting adjusting-screws $k\ k$ carried by said annulus, acting longitudinally of the pipe for effecting a fixed engagement between the packing-strip and an opposed face of a pipe-joint, substantially as described.

3. The combination with an annulus formed in sections, of means for securing said annulus about a pipe, a second annulus formed in sections and inclosed by the first aforesaid annulus and having a packing-face, and longitudinally-acting screws $k\ k$ carried by the first aforesaid annulus adapted for engagement with the latter annulus to force the same longitudinally of the pipe and thereby effect fixed engagement between the packing-face and the pipe-joint, substantially as described.

4. The combination with an annulus formed in sections, of means for securing said annulus about a pipe, a second annulus formed in sections and inclosed by the first aforesaid annulus and having a packing-face, outwardly-projecting lugs $h$ provided upon the second aforesaid annulus, and longitudinally-acting screws $k\ k$ carried by the first aforesaid annulus, adapted for engagement with said lugs to force the annulus carrying the same longitudinally of the pipe and thereby effect fixed engagement between the packing-face and the pipe-joint, substantially as described.

5. The combination with an annulus formed in sections, of means for securing said annulus about a pipe, a second annulus formed in sections and inclosed by the first aforesaid annulus and having a packing-face, outwardly-projecting lugs $h$ provided upon the second aforesaid annulus and projecting within recesses provided in the first aforesaid annulus, and longitudinally-acting screws $k\ k$ carried by the first aforesaid annulus adapted for engagement with said lugs to force the annulus carrying the same longitudinally of the pipe and thereby effect fixed engagement between the packing-face and the pipe-joint, substantially as described.

6. The combination with an annulus formed in sections; of a plurality of radially-acting screws $d$ for fixing said annulus about a pipe, a second annulus formed in sections and inclosed by the first aforesaid annulus and having a packing-face, and longitudinally-acting screws $k\ k$ carried by the first aforesaid annulus adapted for engagement with the latter annulus to force the same longitudinally of the pipe and thereby effect fixed engagement between the packing-face and the pipe-joint, substantially as described.

In witness whereof I hereunto subscribe my name this 21st day of June, A. D. 1899.

HENRY P. G. REED.

Witnesses:
HARRY C. STACY,
GEORGE L. CRAGG.